(12) United States Patent  
Akagawa et al.

(10) Patent No.: US 8,612,495 B2  
(45) Date of Patent: Dec. 17, 2013

(54) COMPUTER AND DATA MANAGEMENT METHOD BY THE COMPUTER

(75) Inventors: Etsutaro Akagawa, Kawasaki (JP); Takahiro Nakano, Yokohama (JP); Atsushi Sutoh, Yokohama (JP); Yohsuke Ishii, Yokohama (JP); Jun Nemoto, Yokohama (JP)

(73) Assignee: Hitachi, Ltd., Tokyo (JP)

(*) Notice: Subject to any disclaimer, the term of this patent is extended or adjusted under 35 U.S.C. 154(b) by 130 days.

(21) Appl. No.: 13/133,923

(22) PCT Filed: May 31, 2011

(86) PCT No.: PCT/JP2011/003067  
§ 371 (c)(1),  
(2), (4) Date: Jun. 9, 2011

(87) PCT Pub. No.: WO2012/164617  
PCT Pub. Date: Dec. 6, 2012

(65) Prior Publication Data  
US 2012/0311002 A1   Dec. 6, 2012

(51) Int. Cl.  
*G06F 17/30* (2006.01)

(52) U.S. Cl.  
USPC ........... 707/827; 707/822; 707/823; 707/824; 707/825; 707/826; 707/828; 714/48

(58) Field of Classification Search  
USPC ................... 707/822–828, 999.201, 999.204; 714/48  
See application file for complete search history.

(56) References Cited

U.S. PATENT DOCUMENTS

| | | | |
|---|---|---|---|
| 2004/0167859 A1* | 8/2004 | Mirabella | 705/59 |
| 2006/0080370 A1* | 4/2006 | Torii et al. | 707/204 |
| 2007/0136391 A1* | 6/2007 | Anzai et al. | 707/201 |
| 2008/0183774 A1 | 7/2008 | Otani et al. | |
| 2010/0095164 A1* | 4/2010 | Kamei et al. | 714/48 |

* cited by examiner

*Primary Examiner* — Syling Yen  
(74) *Attorney, Agent, or Firm* — Volpe and Koenig, P.C.

(57) ABSTRACT

The client computer which transmits an access request specifying an object existing in the first file system and the second computer which accesses the second file system are connected to the first computer which accesses the first file system. The second file system includes a shared directory. A specific object which is an object complying with the path name including the name determined in accordance with the type of the second computer is stored in the shared directory. The controller mounts the shared directory to the first file system. The controller creates a link which comprises a name determined in accordance with a certain naming regulation independent of the type of the computer and corresponds to the specific object in the first file system.

7 Claims, 17 Drawing Sheets

| Computer type | Log type | Regular expression | ... |
|---|---|---|---|
| NAS_A | Access log | access_[0..9]¥.log | ... |
| NAS_B | Access log | access[0..9]¥.log | ... |
| NAS_C | Access log | access_log¥.[0..9] | ... |
| NAS_B | Error log | err_[0..9]¥.log | ... |
| NAS_C | System log | system_[0..9]¥.log | ... |
| ... | ... | ... | ... |

Fig. 19

| Computer type | Name of snapshot before performing Embodiment 1 | Name of snapshot after performing Embodiment 1 |
|---|---|---|
| NAS_A | /mnt/a/.snap/20110101 | /mnt/a/@GMT-2011.01.01-00.00.00 |
| NAS_B | /mnt/b/.ckpt/20110101 | /mnt/b/@GMT-2011.01.01-00.00.00 |
| ... | ... | ... |

Fig. 20

| Computer type | Name of access log before performing Embodiment 6 | Name of access log after performing Embodiment 6 |
|---|---|---|
| NAS_A | /mnt/a/access_log.0 | /mnt/a/access_0.log |
| NAS_B | /mnt/b/access0.log | /mnt/b/access_0.log |
| ... | ... | ... |

COMPUTER AND DATA MANAGEMENT METHOD BY THE COMPUTER

TECHNICAL FIELD

The present invention relates to a data management technology in the computer.

BACKGROUND ART

NAS (Network Attached Storage) is broadly utilized in companies and others for storing data such as business documents and others. Many companies possess a plurality of NAS devices recently. Therefore, a method for efficiently managing data in a plurality of NAS devices becomes necessary.

The Patent Literature 1 describes a technology of copying all data that other NAS devices comprise to one NAS device as a method for managing data in a plurality of NAS devices.

The Patent Literature 2 describes a technology of virtually integrating a plurality of file systems and accessing files stored in the second file system via the first file system. By locating a stub file in which the location of the file in the second file system is stored in the first file system and accessing the stub file, access to the file becomes possible.

CITATION LIST

Patent Literature

[Patent Literature 1] US Patent Application Publication No. 2008/0183774
[Patent Literature 2] US Patent Application Publication No. 2010/0095164

SUMMARY OF INVENTION

Technical Problem

In a system where a plurality of NAS devices manage data, the data access method might be different per NAS device. Therefore, for efficiently managing the data which the plurality of NAS devices comprise, a NAS device comprising a virtualization function capable of integrating the plurality of NAS devices and concealing the differences between these NAS devices from the user is required.

Since all the data must be copied between the NAS devices by the technology of the Patent Literature 1, there is a problem that a considerable amount of time is required before starting the operation.

Furthermore, if the technology of the Patent Literature 2 is used, the storage location of the stub file is different per type of the other NAS device connected to one NAS device, and therefore there is a problem that the user must be conscious of the data storage destination and must change the data access method.

The above-mentioned problems might also occur in other types of computers than NAS.

The present invention is created in view of the above-mentioned problems. The purpose of the present invention is to achieve the access to the second computer via the first computer comprising the virtualization function without copying data from the second computer to the first computer or changing the method for accessing the second computer.

Solution to Problem

A client computer which transmits an access request specifying an object existing in the first file system and the second computer which accesses the second file system are connected to the first computer which accesses the first file system. The second file system includes a shared directory. A specific object which is an object complying with the path name including the name determined in accordance with the type of the second computer is stored in the shared directory. The controller mounts the shared directory to the first file system. The controller creates a link which comprises a name determined in accordance with a certain naming regulation independent of the type of the second computer and corresponds to the specific object in the first file system. The concrete example of the specific object is a snapshot or a log file.

Even if a plurality of shared directories which a plurality of second computers of different types respectively access are mounted to the first file system, a plurality of links corresponding to the plurality of specific objects in the plurality of shared directories are created in the first file system. The names which the respective links comprise are the names determined in accordance with a certain naming regulation independent of the type of the computer. Therefore, the user of the client computer can access the specific object by using the client computer without being conscious of the type of the second computer.

BRIEF DESCRIPTION OF DRAWINGS

FIG. 19 is an example of the snapshot names as seen from the user before and after performing the Embodiment 1.

FIG. 20 is an example of the log names as seen from the user before and after performing the Embodiment 6.

DESCRIPTION OF EMBODIMENTS

Figure 1:
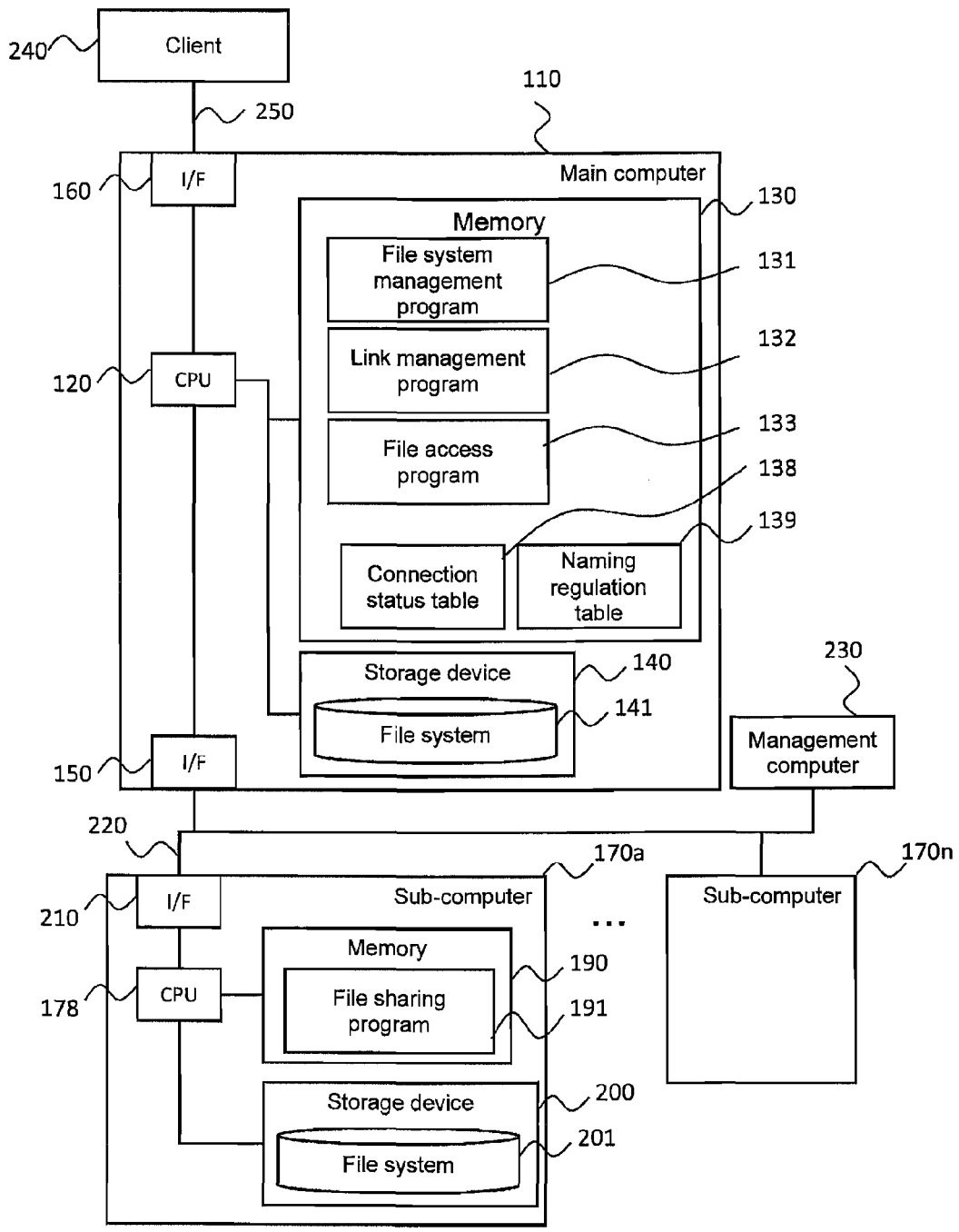
FIG. 1 shows the overview of the common items of the computer system related to the Embodiments from 1 to 7.

Hereinafter, the embodiments of the present invention are explained.

It should be noted that each type of information might be explained by the expression of an "xxx table" hereinafter, but may also be expressed in other types of data configuration than tables. For indicating independency of the data configuration, the "xxx table" can be referred to as "xxx information".

Furthermore, though the processing might be explained by a "program" as a subject hereinafter, the subject of the processing may also be a processor because the program performs specified processing by being performed by the processor (e.g. a CPU (Central Processing Unit)) included in the controller while appropriately using a storage resource (e.g. a memory) and/or a communication interface device (e.g. a communication port). The processing explained with the program as the subject may also be the processing performed by the controller. Furthermore, the controller may also be the relevant processor and may also include a hardware circuit which performs part or all of the processing performed by the processor instead of or in addition to the processor. The computer program may also be installed in the storage control apparatus from the program source. The program source may be, for example, a program distribution server or may also be a storage media which the computer can read.

The storage device to be the base of the file system may be in the computer or may also be outside the computer. In the embodiments below, the storage device to be the base of the file system is assumed to be in the computer.

The computer may be a file server which is a storage control apparatus, for example, a NAS device.

Furthermore, the term "time" is used in the explanation below, and the time includes at least any of the year, the month, the day, the hour, the minute, and the second (which may also include the value after the decimal point).

Furthermore, in the explanation below, if the same type of factors (e.g. sub-computers) is not distinguished, only the common part of the reference signs might be used. For example, in FIG. 18, if a sub-computer 170a and a sub-computer 170b are not distinguished, the "sub-computer 170" might be referred to.

Hereinafter, the Embodiments from 1 to 7 of the present invention are explained with reference to the figures. It should be noted that the first computer comprising the function of performing the virtualization of the file server is referred to as a "main computer" and the second computer connected to the main computer is referred to as a "sub-computer" in the explanation below. The file server virtualization technology is the technology for virtualizing a plurality of shared units (logical publication units) provided by a plurality of sub-computers as one name space. The one name space might also be referred to as a global name space (GNS). The main computer can structure a pseudo file system by integrating a plurality of shared directories provided by the plurality of sub-computers. If there is a request from the client to an object in the file and others, the main computer can transfer the request to the sub-computer where the object exists.

Figure 18:
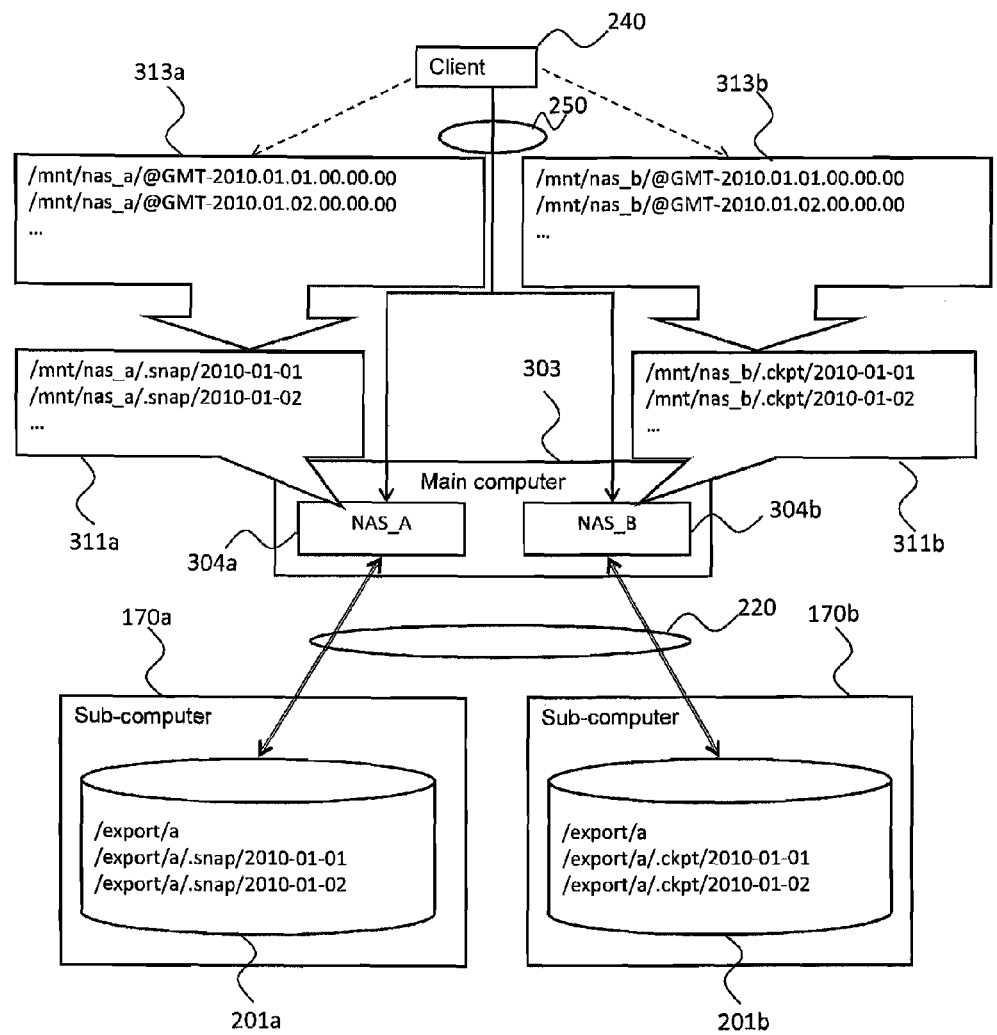
FIG. 18 is a diagram showing an overview of the common items through the Embodiments from 1 to 7 of the present invention.

FIG. 18 is a diagram showing an overview of the common items through the Embodiments from 1 to 7 of the present invention. At this step, the snapshots are explained as an example of the data.

The main computer 110 is connected to the sub-computer 170a and the sub-computer 170b via a data network 220. Furthermore, the main computer 110 is connected to a client 240 via an operation network 250.

Two snapshots (specifically speaking, a snapshot as of Jan. 1, 2010 and a snapshot as of Jan. 2, 2010) are created in a file system 201a managed by the sub-computer 170a. As an example of the method for accessing these snapshots, FIG. 18 shows a method for accessing a directory created under "/export/a/.snap" which is a root directory of the file system 201a. The snapshots are stored in the directory created under "/export/a/.snap". The name of the directory "/export/a/.snap" is the name determined in accordance with the type of the sub-computer 170a. The object comprising a name determined in accordance with the type of the sub-computer 170a (a directory or a file) is not limited to a snapshot and/or a directory in which the snapshot is stored. Another type of object is a log file, for example.

Furthermore, two snapshots are also created in a file system 201b managed by the sub-computer 170b. As an example of the method for accessing these snapshots, FIG. 18 shows a method for accessing a directory created under "/export/a/.ckpt" which is the root directory of the file system 201b. The snapshots are stored in the directory created under "/export/a/.ckpt". The name of the directory "/export/a/.ckpt" is the name determined in accordance with the type of the sub-computer 170b. The object comprising a name determined in accordance with the type of the sub-computer 170b (a directory or a file) is not limited to a snapshot and/or a directory in which the snapshot is stored.

The file system 201a is associated with a directory 304a managed by the main computer 110, and the file system 201b is associated with a directory 304b managed by the main computer 110.

If the client computer (hereinafter referred to as the client) 240 accesses the directory 304a, by the operation of the programs in the main computer 110, as the data in the directory 304a, as shown in a box 311a, the main computer 110 can provide the stub of the snapshots in the file system 201a to the client 240. The stub is the object (e.g. metadata) associated with the directory or the storage destination information of the file (information indicating the link destination). Similarly, if the client 240 accesses the directory 304b, as the data in the directory 304b, as shown in a box 311b, the main computer 110 can provide the stub of the snapshots in the file system 201b to the client 240. Specifically speaking, the client 240 can access the snapshots managed by the sub-computer 170a or the sub-computer 170b by accessing the directory 304a or the directory 304b managed by the main computer 110.

However, as explained above, the method for accessing the snapshots is different depending on the type of sub-computer 170 generally. Therefore, the client 240 must change the access method in accordance with the type of the sub-computer 170 corresponding to each of the directories in the main computer 110. This is both burden and troublesome for the user of the client 240. The access path to the snapshot is different per sub-computer 170 in the example of FIG. 18. Specifically speaking, for determining that the computer corresponding to the directory 304a is the sub-computer 170a and also referring to the snapshots of the sub-computer 170a, the user of the client 240 cannot refer to the snapshots managed by the sub-computer 170a without knowing that it is necessary to refer to the directory under ".snap". Furthermore, for determining that the computer corresponding to the directory 304b is the sub-computer 170b and also referring to the snapshots of the sub-computer 170b, the user of the client 240 cannot refer to the snapshots managed by the sub-computer 170b without knowing that it is necessary to refer to the directory under ".ckpt".

Therefore, in the Embodiments from 1 to 7, the main computer 110 creates a link (an object) in accordance with a certain rule independent of the type of the sub-computer 170. By this method, the snapshots managed by the sub-computer 170 are virtualized.

The link destination of the created link may be the snapshots managed by the sub-computer 170 or may also be the stubs of the snapshots.

Furthermore, a "certain rule" is a link naming rule, for example. According to the example of FIG. 18, the information indicating the time of acquiring a snapshot in accordance with a certain rule regardless of by which of the sub-computers 170a or 170b the snapshot is managed is supposed to be the name of the link corresponding to the snapshot (e.g. "@GMT-2010.01.01.00.00.00").

In the Embodiments from 1 to 7, instead of the stub, the link is provided to the client 240. Specifically speaking, as the data in the directory 304a, as shown in a box 313a, the main computer 110 can provide the link corresponding to the snapshots in the file system 201a to the client 240. Similarly, if the client 240 accesses the directory 304b, as the data in the directory 304b, as shown in a box 313b, the main computer 110 can provide the link corresponding to the snapshots in the file system 201b to the client 240.

If a link (e.g. a link whose path name is "/mnt/nas_a/@GMT-2010.01.01.00.00.00") is accessed from the client 240, the main computer 110 transmits an access request specifying a snapshot corresponding to the link (e.g. a snapshot whose path name is "/export/a/.snap/2010-01-01") to the sub-computer 170 (e.g. 170a) which manages the snapshot.

According to the Embodiments from 1 to 7, as shown in the boxes 313a and 313b, the client 240 can access the snapshots managed by the sub-computer 170 without depending on the type of the sub-computer 170. As the name of the link provided to the client 240 is the name provided in accordance with the rule independent of the type of the sub-computer 170, the user of the client 240 may not have to be conscious of what type of sub-computer 170 the snapshots exist in.

Hereinafter, the common configuration through the Embodiments from 1 to 7 is explained with reference to Figures from 1 to 3.

FIG. 1 shows the overview of the common items of the computer system related to the Embodiments from 1 to 7.

The main computer 110 comprises a communication interface device, a storage resource, and a controller connected to the above. As the communication interface device, for example, a data interface 150 (data I/F 150) and an operation network interface 160 (hereinafter referred to as an operation I/F 160) exist. The storage resource includes a memory 130 and a storage device 140, for example. The controller is a CPU 120, for example.

A file system management program 131, a link management program 132, a file access program 133, a connection status table 138, and a naming regulation table 139 are stored in the memory 130. The main computer 110 performs the respective programs by using the CPU 120.

The file system management program 131 comprises a function of performing the processing for the file system 141. A concrete example of the processing is the processing of logically partitioning the physical storage area which the storage device 140 comprises and creating a file system 141, the processing of deleting the file system 141, and others.

The file system 141 stores each of the files and the metadata of each of the files (e.g. the data indicating the owner and the creation date and time of the file). The data in the file system 141 (the file and the metadata of the same) is stored in the storage device 140 which is the base of the file system 141. Though one or more storage media which the storage device 140 comprises are hard disk drives in the Embodiments from 1 to 7, other type of media such as flash media may also be permitted instead of or in addition to the same.

The link management program 132 comprises a function of performing the processing for the link in the file system 141. A concrete example of the processing is the processing of creating a link for a certain file or directory in the file system 141 and the processing of deleting the relevant link. It should be noted that a symbolic link exists as a concrete example of the link. Even if the link destination does not exist, a symbolic link can be created. However, the link is not limited to the symbolic link as long as the link is an object indicating a certain file or a directory.

The file access program 133 comprises a function of accessing a file or a directory which the other computers than the main computer 110 comprise via the data I/F 150 and reading/writing the data in the relevant file or directory. Specifically speaking, for example, if a shared directory published by the sub-computer 170 is connected to the mount point in the file system 141 and if another program reads/writes the file or directory under the relevant mount point, the file access program 133 accesses the sub-computer 170. Subsequently, the file access program 133 reads/writes the file or directory under the relevant shared directory corresponding to the relevant file or directory and returns the result to the relevant other program. The protocol used for the relevant access is, for example, the CIFS (Common Internet File System) protocol, the NFS (Network File System) protocol, or the HTTP (Hyper Text Transport Protocol), but other protocols may also be permitted.

For the file access program 133 to access the files in the sub-computer 170, the storage location of the files in the sub-computer 170 has only to be managed by a certain method. For example, in the example of FIG. 18, the method for creating the stub files of the snapshots exists. Per file in the file system 201 which the sub-computer 170 manages, the stub file includes the information indicating the storage location of the file. By using the stub file, the file or directory which the sub-computer 170 comprises are virtually created in the file system 141. The client 240 can access the file in the sub-computer 170 by accessing the stub file. Subsequently, the link management program 132 can create a link whose link destination is the stub file. This method realizes two virtual hierarchies. The object complying with the first virtual hierarchy is a stub (that is, the virtual object in the directory or the file stored in the file system 201 in the sub-computer 170). Subsequently, the object complying with the second virtual hierarchy (the higher hierarchy than the first virtual hierarchy) is the link whose link destination is the stub.

The sub-computer 170 (170a to 170n) comprises a communication interface device, a storage resource, and a controller connected to the above. As the communication interface device, for example, a data interface 210 (hereinafter referred to as a data I/F 210) exists. The storage resource includes a memory 190 and a storage device 200, for example. The controller is a CPU 180, for example.

A file sharing program 191 is stored in the memory 190. The sub-computer 170 performs the relevant program by using the CPU 180.

The file sharing program 191 comprises a function of reading the data of the file or directory stored in the file system 201 based on the storage device 200, transmitting the same to the other computers via the data I/F 210, and also writing the data received from the other computers to the relevant file or directory. The protocol used for the communication with the other computers is, for example, the CIFS protocol, the NFS protocol, or the HTTP, but other protocols may also be permitted.

The client 240 instructs the main computer 110 to read/write data via the operation network 250. The main computer 110 which received this read/write instruction writes the data to the file system 141 or reads the data from the file system 141, and transmits the processing result to the client computer 240. The protocol used for the communication between the client 240 and the main computer 110 is, for example, the CIFS protocol, the NFS protocol, or the HTPP, but other types of protocols may also be permitted.

A management computer 230 manages the main computer 110 and the sub-computers 170 by transmitting and receiving the instructions to the respective programs which the main computer 110 and the sub-computers 170 comprise via the data network 220.

As the operation network 250 and the data network 220, LAN (Local Area Network) or SAN (Storage Area Network) can be adopted, but other communication networks may also be permitted.

Figure 2:
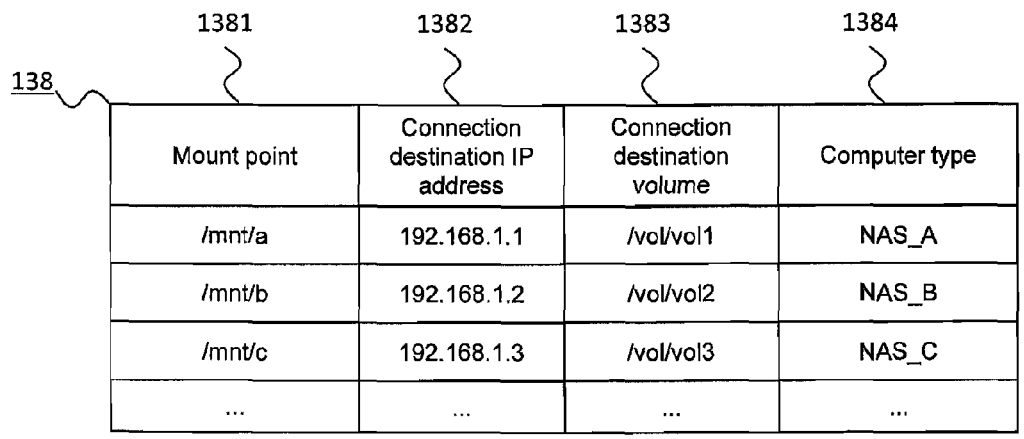
FIG. 2 shows an example of the configuration of a connection statustuble 138.

FIG. 2 shows an example of the configuration of the connection status table 138.

The connection status table 138 comprises the information related to the relationship between the shared directories published by the file sharing program 191 in the sub-computer 170 and the mount destinations of the same. Specifically speaking, for example, per shared directory of the sub-computer 170, the connection status table 138 comprises a mouse point 1381, a connection destination IP address 1382, a connection destination volume 1383, and a computer type 1384.

The mouse point 1381 indicates the path name to an object (an object in the file system 141 in the main computer 11Q (e.g. a directory)) which is the mount destination of the shared directory published by the file sharing program 191 in the sub-computer 170. If a program in the main computer 110 accesses [the object] in accordance with the relevant path name, the file access program 133 can access the shared directory in the sub-computer 170.

The connection destination IP address 1382 is the information indicating the IP address of the sub-computer 170 comprising the shared directory mounted to the object complying with the path name indicated by the mouse point 1381. Instead of or in addition to the connection destination IP address 1382, as the identification information of the sub-computer 170 comprising the shared directory mounted to the object complying with the path name indicated by the mouse point 1381, other types of information (e.g. the name or the identifier of the sub-computer 170) may also be adopted.

The connection destination volume 1383 is the information indicating the path name of the shared directory of the sub-computer 170. Instead of or in addition to the path name shown in the figure, other types of identifiers by which the path published by the file sharing program 191 can be identified may also be adopted.

The computer type 1384 is the information indicating the type of the sub-computer 170 comprising the shared directory.

Figure 3:
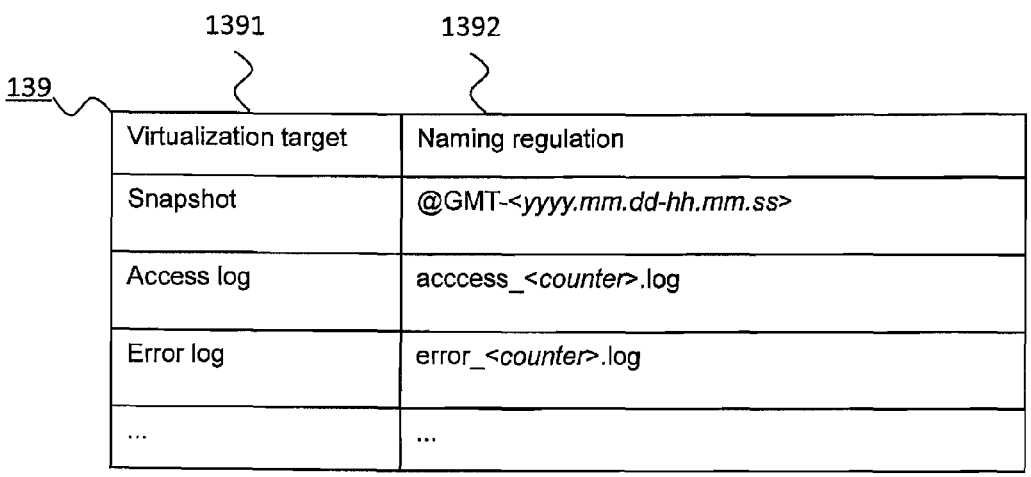
FIG. 3 shows an example of the configuration of a naming regulation table 139.

FIG. 3 shows an example of the configuration of the naming regulation table 139.

The naming regulation table 139 comprises the information indicating the regulation for determining a link name. The naming regulation table 139, per virtualization target type for example, comprises a virtualization target 1391 which is the information indicating the type of the virtualization target and a name regulation 1392 which is the information indicating the regulation of the name used for virtualizing the virtualization target. As the type of the virtualization target, in addition to the above-mentioned snapshot, other types such as a log file (e.g. an access log and an error log) exist. By making the name regulation 1392 corresponding to the snapshot the form of "@GMT-<year in 4 digits.month in 2 digits.day in 2 digits-hour in 2 digits.minute in 2 digits.second in 2 digits", the client 240 utilizing the CIFS protocol can treat each of the snapshots as a version of the file system.

The common items of the Embodiments from 1 to 7 are as explained above. The respective embodiments are explained below.

Embodiment 1

The present embodiment is the embodiment in which, when other NAS devices comprising the virtualization function (the main computer) are connected to a NAS device (the sub-computer), a link is created for the snapshots which the other NAS devices comprise.

The snapshot function is the function of saving the entire image of the file system at a certain instant. Since the user can restore the image at the point of time at which the image was saved in the past by using this function in case [the user] performs the wrong operation and in other cases, this is the mandatory function for the user utilizing the NAS devices. Nearly all the NAS devices comprise the snapshot function currently.

The snapshots are stored in a specified directory per NAS device generally. Therefore, the snapshot access method is different per NAS device. For example, in case of different NAS vendors, this type of difference occurs. Therefore, the virtualization function must absorb this difference.

Therefore, by generating the name of this link in accordance with a certain regulation independent of the type of NAS, the user using the main computer can access [the snapshots] as if [the snapshots were] the snapshots which the main computer comprises without being conscious of the differences among the NAS devices.

Figure 4:
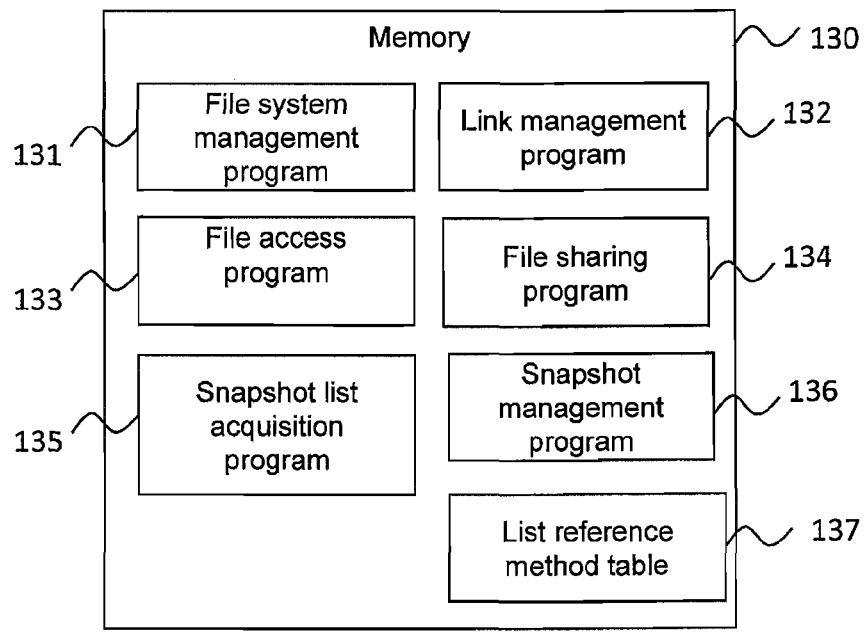
FIG. 4 shows an example of information and programs stored in a memory 130 which a main computer 110 related to the Embodiment 1 comprises.

FIG. 4 shows an example of the information and programs stored in the memory 130 which the main computer 110 related to the Embodiment 1 comprises.

In addition to the information and programs in FIG. 1, the memory 130 stores a file sharing program 134, a snapshot list acquisition program 135, a snapshot management program 136, and the list reference method table 137.

The file sharing program 134 comprises a function of reading the data of the file or directory stored in the file system 141, transmitting the same to the other computers via the data I/F 150, and also writing the data received from the other computers to the relevant file or directory. The protocol used for the communication with the other computers is, for example, the CIFS protocol, the NFS protocol, or the HTTP, but other protocols may also be permitted.

The snapshot list acquisition program 135 comprises a function of acquiring a list of snapshots which the sub-computer 170 comprises and the time at which the respective snapshots were created by utilizing the list reference method table 137 explained later. Furthermore, this program 135 may also comprise a function of editing the list reference method table 137.

The snapshot management program 136 comprises a function of performing the processing for the snapshots in the file system 141. The concrete examples of the processing are the processing of creating a snapshot in the file system 141 at a certain point of time, the processing of deleting the same, and the processing of, if another program reads [data] from a file or a directory in the created snapshot, reading the data of the relevant file or directory.

Figure 5:
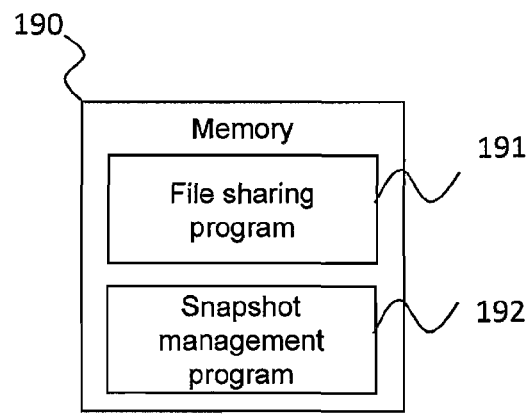
FIG. 5 shows an example of information and programs stored in a memory 190 which a sub-computer 170 related to the Embodiment 1 comprises.

FIG. 5 shows an example of the information and programs stored in the memory 190 which the sub-computer 170 related to the Embodiment 1 comprises.

The memory 190 stores a snapshot management program 192 in addition to the file sharing program 191.

The file sharing program 191 comprises the same function as the above-mentioned file sharing program 134.

The snapshot management program 192 comprises a function of performing the processing for the snapshots in the file system 201. The concrete examples of the processing are the processing of creating a snapshot in the file system 201 at a certain point of time, the processing of deleting the same, and the processing of, if another program reads [data] from a file or a directory in the created snapshot, reading the data of the relevant file or directory.

Figure 6:
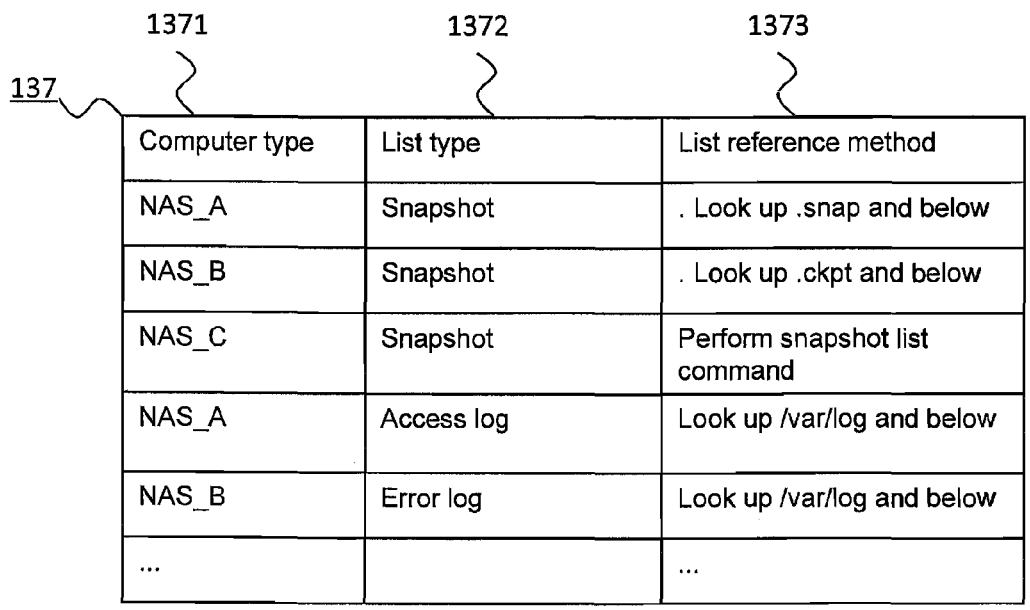
FIG. 6 shows an example of the configuration of a list reference method table 137.

FIG. 6 shows an example of the configuration of the list reference method table 137.

The list reference method table 137 comprises the information indicating the relationship between the type of sub-computer 170 and the method for identifying the virtualization target from the sub-computer 170. The list reference method table 137, per type of the sub-computer 170 for example, comprises a computer type 1371 which is the information indicating the type of the sub-computer 107, a list type 1372 which is the information indicating the type of the list to be acquired, and a list reference method 1373 which is the information indicating the method for acquiring the list of the virtualization targets. According to the list reference method 1373 in the first row in FIG. 6, for the main computer 110 to refer to the snapshot of the file system 201 in the sub-computer 107 whose sub-computer type is "NAS_A", the main computer 110 has only to look up ".snap" and below.

Figure 7:
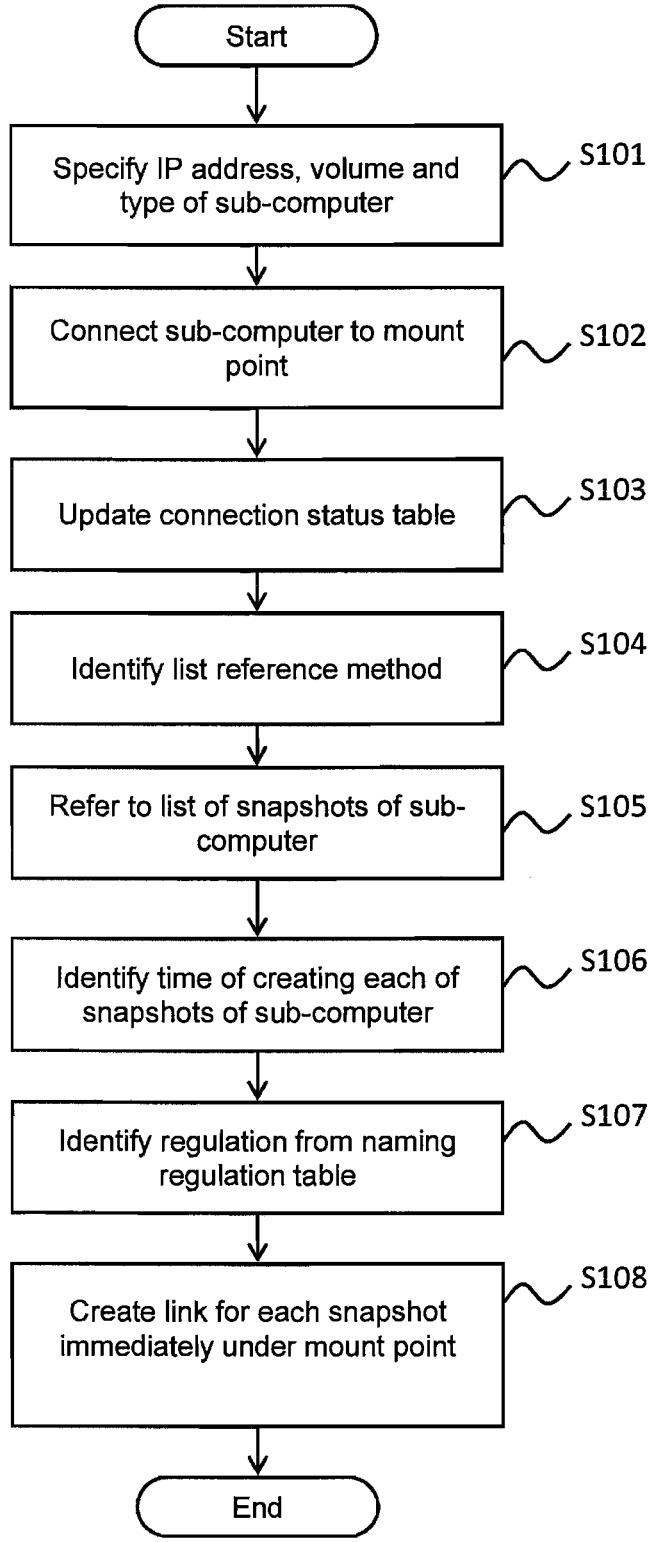
FIG. 7 is a flowchart showing an example of the processing procedure for virtualizing snapshots which the sub-computer 170 comprises.

FIG. 7 is a flowchart showing an example of the processing procedure for virtualizing snapshots which the sub-computer 170 comprises.

Firstly, by using the management computer 230, the administrator specifies a mount point, an IP address of the sub-computer 170, a volume provided by the file sharing program 191, and the type of the sub-computer 170 (S101).

Next, the file access program 133 connects the relevant volume (shared directory) in the sub-computer 170 to the mount point (S102). This volume is the volume including the snapshot. By this processing, the client 240 can access the snapshot which the sub-computer 170 comprises via the main computer 110. In case where a stub file is used, the stub file corresponding to each of the snapshots is created in this processing.

Next, the file access program 133 adds the value specified by the administrator at S101 to the connection status table 138 (S103).

Next, the snapshot list acquisition program 135 refers to the list reference method table 137 and identifies the list reference method 1373 corresponding to the type of the sub-computer 170 connected at S102 (S104).

Next, the snapshot list acquisition program 135 identifies a list of the snapshots which the sub-computer 170 comprises based on the identified list reference method 1373 (S105).

Next, the snapshot list acquisition program 135 identifies the time of creating each of the identified snapshots (S106). The time of creating the snapshot may be identified by the name of the snapshot or may also be identified by the table for managing the snapshots (not shown in the figure).

Next, the link management program 132 refers to the naming regulation table 139 and identifies the name regulation 1392 corresponding to the snapshot (S107).

Finally, the link management program 132 creates a link for each of the snapshots identified at S105 immediately under the mount point specified by the administrator at S101 in accordance with the name regulation 1392 identified at S107 (S108). If the name regulation 1392 is "@GMT-<yyyy.mm.dd-hh.mm.ss>", by assigning the date and time identified at S106 (year, month, day, hour, minute, second), the link management program 132 creates the name of the link corresponding to the snapshot created at the date and time. At this step S108, for example, per stub created at S102, a link whose link destination is the stub may be created. If the list reference method 1373 of the snapshot is "look up .snap and below" for example, the link management program 132 creates the link corresponding to each of the snapshots "under .snap and below" immediately under the mount point. The allocation location of the link may not have to be immediately under the mount point and may also be the location specified by the administrator.

By performing the above-mentioned processing, the link for the snapshot which the sub-computer 170 comprises is created in the file system 141 of the main computer 110. The link comprises the name complying with a certain regulation independent of the type of the sub-computer 170. Therefore, seen from the user using the client 240 which accesses the main computer 110, it looks as if the main computer 110 was creating the snapshot. Therefore, it is supposed that the snapshot which the sub-computer 170 comprises is virtualized in the main computer 110.

Figure 8:
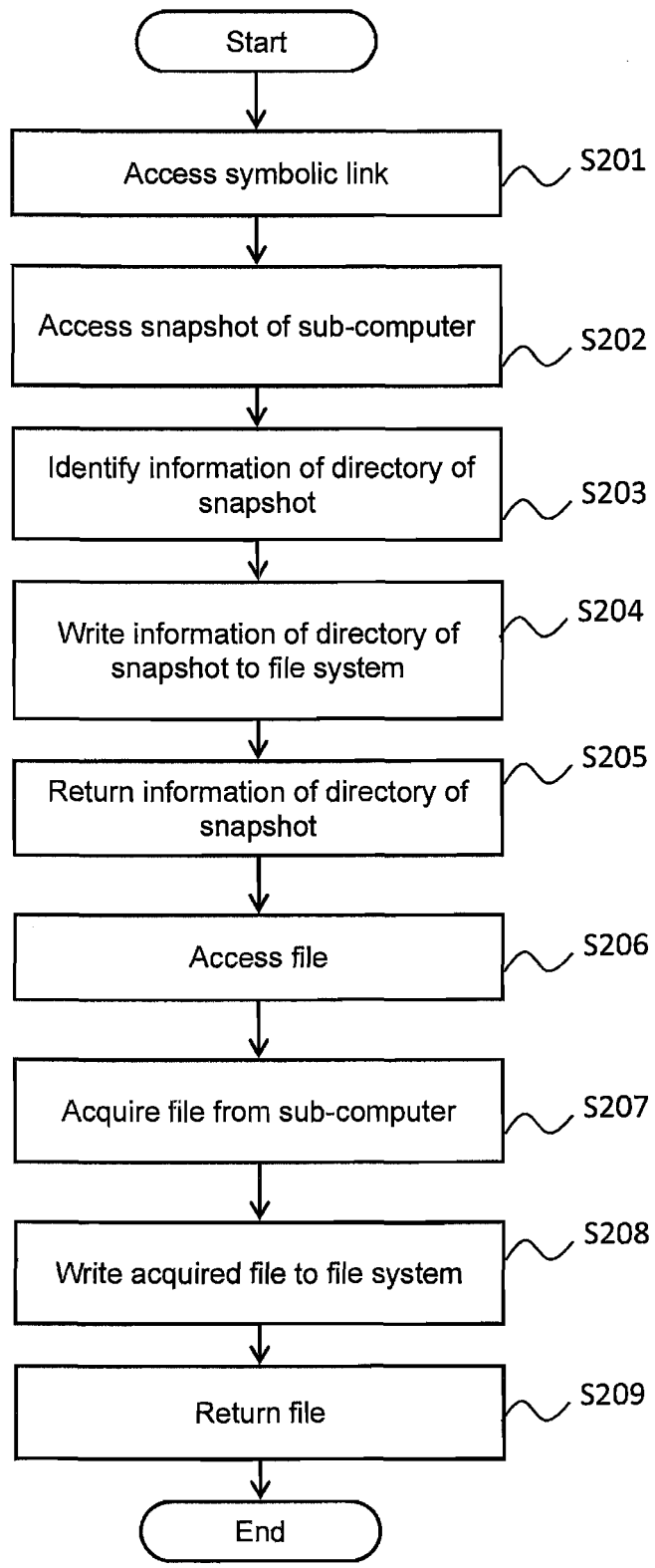
FIG. 8 is a flowchart showing an example of the access procedure for the snapshots virtualized by the processing in FIG. 7.

FIG. 8 is a flowchart showing an example of the access procedure for the snapshots virtualized by the processing in FIG. 7.

Firstly, a program in the main computer 10 accesses a link in the file system 141 (S201). As an example of the trigger for the occurrence of access, there is a trigger that the file sharing program 134 receives an access request which specifies a link corresponding to a snapshot from the client 240. At this step, the file system 141 returns the result in which the link destination is interpreted to the relevant program, and the relevant program accesses the snapshot immediately under the mount point. For example, if the relevant link is "/mnt/a/@GMT-2011.01.01-00.00.00" and the link destination is "/mnt/a/.snap/20110101000000", the program which accessed the relevant link accesses the directory of the link destination.

Next, the file access program 133 accesses the snapshot which the sub-computer 170 comprises and which corresponds to the relevant result of interpretation in accordance with the connection status table 138 (S202). In the above-mentioned case, the file access program 133 accesses ".snap/20110101000000" immediately under the volume published by the file sharing program 191.

Next, the file access program 133 identifies the information of the directory corresponding to the relevant snapshot (S203). The information of the directory is the list of the names of the files and directories included in the directory and others.

Next, the file access program 133 writes the information of the identified directory to the file system 141 (S204).

Next, the file system 141 returns the information written at S204 to the access source program (S205).

Next, the file access program 133 accesses the file in the snapshot in accordance with the information of the identified directory (S206).

Next, the file access program 133 acquires the file from the sub-computer 170 (S207).

Next, the file access program 133 writes the acquired file to the file system 141 (S208). Specifically speaking, the acquired file is cached to the file system 141.

Finally, the file system 141 returns the file written at S208 to the access source program (209).

By performing the processing of S204 and S205, if the access to the same link occurs again, the information in the file system 141 can be returned without accessing the sub-computer 170 and therefore the result of the access can be quickly returned to the program. Furthermore, as the information of the directory which is not accessed is not written to the file system 141, the consumption of the capacity of the file system 141 can be inhibited. Furthermore, as the data transfer amount from the sub-computer 170 can be reduced, the data transfer time can be reduced.

Furthermore, by performing the processing of S207 and S208, if the access to the same file occurs again, the file in the file system 141 can be returned without accessing the sub-computer 170 and therefore the result of the access can be quickly returned to the program.

As explained above, by performing the processing explained in FIG. 7 and FIG. 8, the client 240 can access any of the snapshots that any of the sub-computers 170 comprises by a certain rule. For example, as shown in FIG. 19, it is possible to access the snapshots in any of the sub-computers 170 by a rule "@GMT-YYYY.MM.DD-HH.MM.SS". Specifically speaking, the snapshots in the sub-computers (other NAS devices) 170 are virtualized in the main computer 110.

Furthermore, a snapshot is the image of the entire file system at a certain instant, and a large number of snapshots are stored in the sub-computers. By the technology of the present embodiment, it is not necessary to copy all the snapshots from the sub-computer 170 to the main computer 110, and it becomes possible to start the operation without terminating the NAS devices when the main computer 110 is connected to the sub-computer 170. Furthermore, the use amount of the file system 141 of the main computer 110 can be reduced and the data transfer time can also be reduced because all the snapshots are not copied, and therefore the user can utilize the snapshot virtualization function soon.

Embodiment 2

Hereinafter, the Embodiment 2 of the present invention is explained. The differences from the Embodiment 1 are mainly explained therein, and the explanation of what is common to the Embodiment 1 is omitted or simplified.

According to the Embodiment 1, the snapshots in the sub-computer 170 (e.g. NAS) can be virtualized in the main computer 110.

When accessing from the main computer 110 to the sub-computer 170, the file access program 133 writes the acquired information in the directory and files to the file system 141. As explained above, by caching the information in the directory and files to the file system 141, the main computer 110 can respond to the access requests specifying the relevant directory or file quickly from the next time.

If the main computer 110 creates a snapshot of the file system 141 at this step, the data cached to the file system 141 (hereinafter referred to as cache data) is supposed to be included in the snapshot. If the cache data (e.g. the information in the above-mentioned directory and files) is included in the snapshot, the capacity of the snapshot increases. Furthermore, if the cache data is deleted after the snapshot is created, the cache data is not included in the next snapshot, and therefore the cache data which is deleted must be saved as a snapshot for maintaining the consistency, which increases the capacity of the snapshot. Therefore, the method in which the administrator starts the operation by using a new file system in the main computer 110 for creating the snapshot in the main computer 110 can be considered. However, the snapshot in the sub-computer 170 cannot be referred to from the new file system. This is complicating because the file system to which the sub-computer 170 is connected must be accessed instead of the new file system for the purpose of accessing the data in the snapshot of the sub-computer 170.

Therefore, in the present embodiment, before starting the operation by the new file system in the main computer 110, the links created for the snapshots which the sub-computer 170 comprises are migrated to the new file system. According to the present embodiment, the client 240 utilizing the main computer 110 can access the snapshots in the sub-computer 170 as if [the snapshots] were the snapshots of the new file system.

Figure 9:
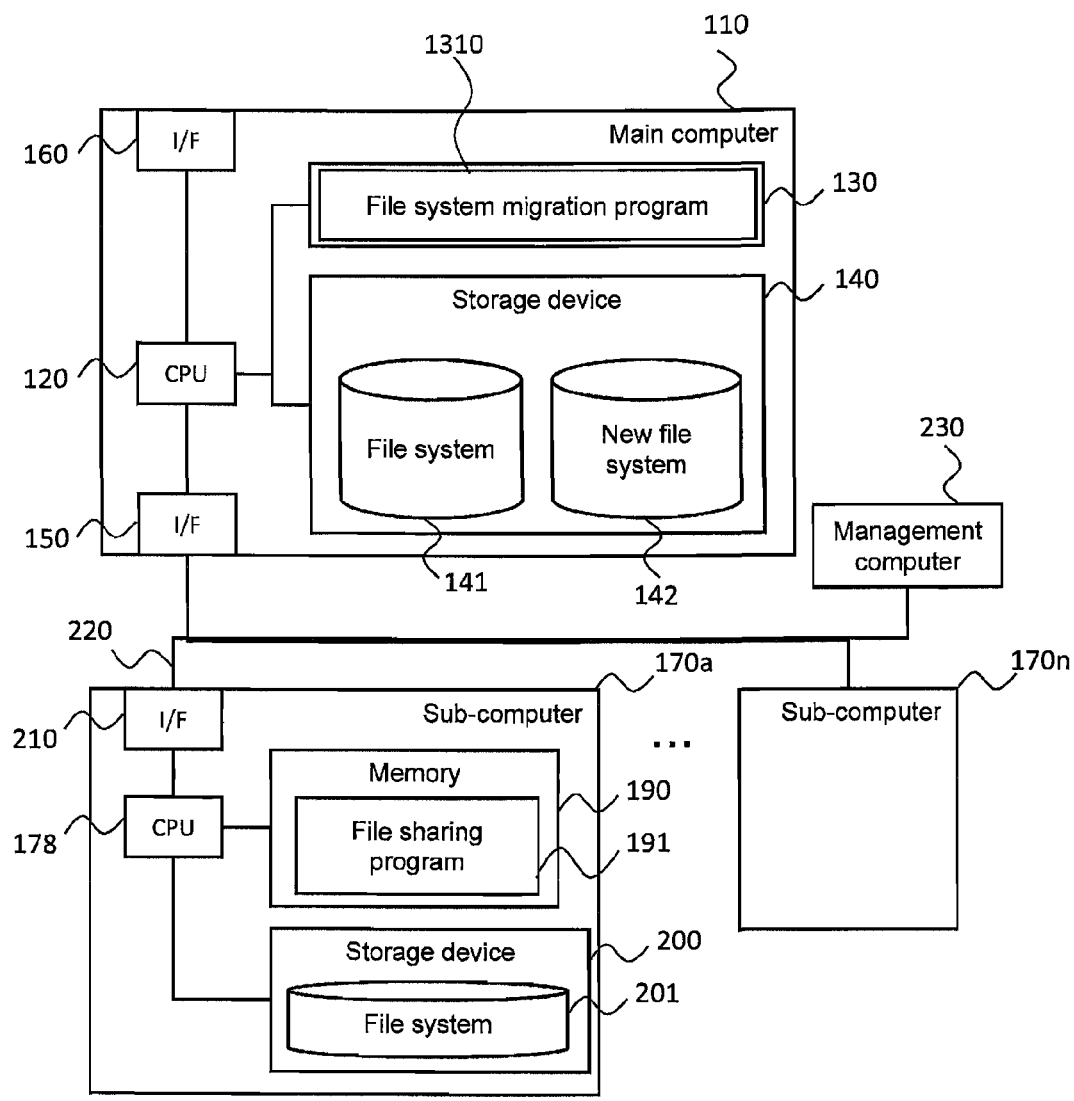
FIG. 9 shows an example of the configuration of the computer system including the main computer 110 related to the Embodiment 2.

FIG. 9 shows an example of the configuration of the computer system including the main computer 110 related to the Embodiment 2.

A file system migration program 1310 is stored in the memory 130 in addition to the respective programs and the respective tables in the Embodiment 1.

The new file system 142 is created in addition to the file system 141 in accordance with the storage device 140. The sub-computer 170 is connected to the mount point in the file system 141 as shown in the Embodiment 1.

Figure 10:
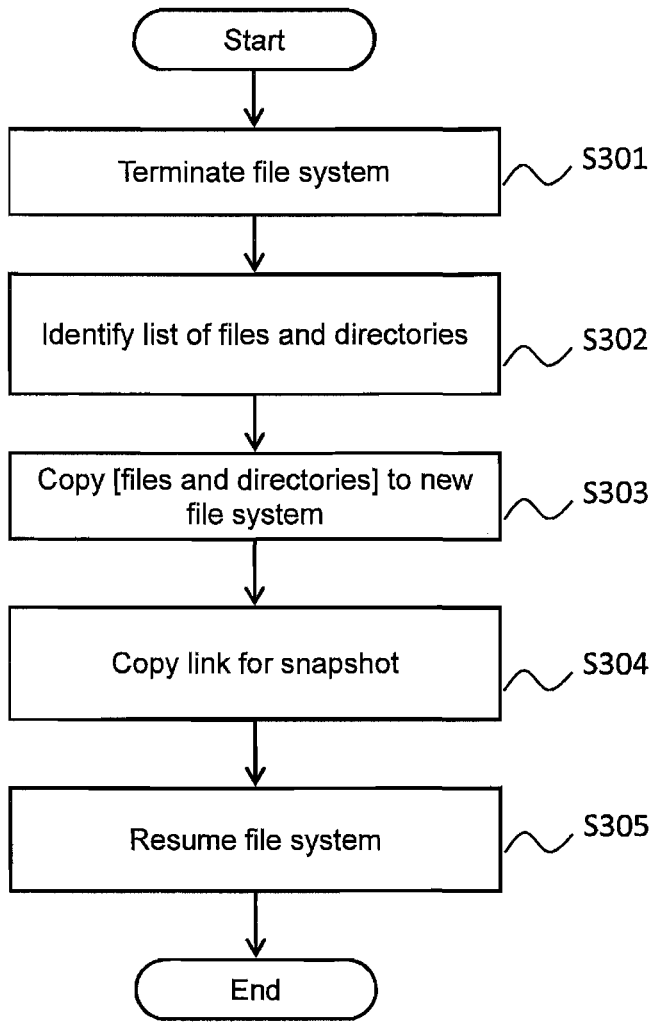
FIG. 10 is a flowchart showing an example of the processing procedure for starting the operation by switching from a file system 141 to a new file system 142 in the Embodiment 2.

FIG. 10 is a flowchart showing an example of the processing procedure for starting the operation by switching from the file system 141 to the new file system 142 in the Embodiment 2.

Firstly, the administrator operates the management computer 230, and the management computer 230 instructs the main computer 110 to terminate the operation of the file system 141 (S301).

Next, the file system management program 1310 identifies the list of the files and directories existing in the file system 141 (S302). Because only the files and directories accessed after the sub-computer 170 is connected to the main computer 110 exist in the list identified at this step, only the required files and directories can be copied to the new file system 142 by performing S302.

Next, the file system migration program 1310 copies the files and directories identified at S302 to the new file system 142 (S303).

Next, the file system migration program 1310 copies the links which the link management program 132 created immediately under the file system 141 to the new file system 142 (S304). As explained in the Embodiment 1, the relevant links are the links associated with the snapshots in the sub-computer 170.

Finally, the file system migration program 1310 starts the operation of the new file system 142 (S305).

By this method, the links for the snapshots in the sub-computer 170 can be migrated to the new file system 142 while leaving the cache data of the file system 141 remaining in the file system 141. Since the cache data remains in the file system 141, it is possible to quickly respond to the access request specifying the cache data (e.g. the file).

If the client 240 accesses the link in the new file system 142, it is possible to access the snapshot in the sub-computer 170 corresponding to the link via the file system 141.

By performing the above-mentioned processing, the client 240 can access the snapshot in the sub-computer 170 as if [the snapshot] was the snapshot of the new file system.

Embodiment 3

Hereinafter, the Embodiment 3 of the present invention is explained. The differences from the Embodiment 2 are mainly explained therein, and the explanation of what is common to the Embodiment 2 is omitted or simplified.

According to the present embodiment, a link is created by the same naming regulation as the link corresponding to the snapshot in the sub-computer 170 after the operation of the new file system 142 is started. At this step, the interval at which the sub-computer 170 creates snapshots is set for the main computer 110 without any manual operation. By this method, the step at which the administrator sets the snapshot creation interval for the main computer 110 again can be skipped.

In the present embodiment, a snapshot of the new file system 142 is created after the links are migrated to the new file system 142. However, instead of the new file system 142 being prepared, the snapshot of the file system 141 may also be created in the file system 141. In this case, it is only required to use the system of the Embodiment 1 and consider the new file system 142 in the explanation below as the file system 141.

The computer system in the present embodiment may be the same as the computer system related to the Embodiment 2.

Figure 11:
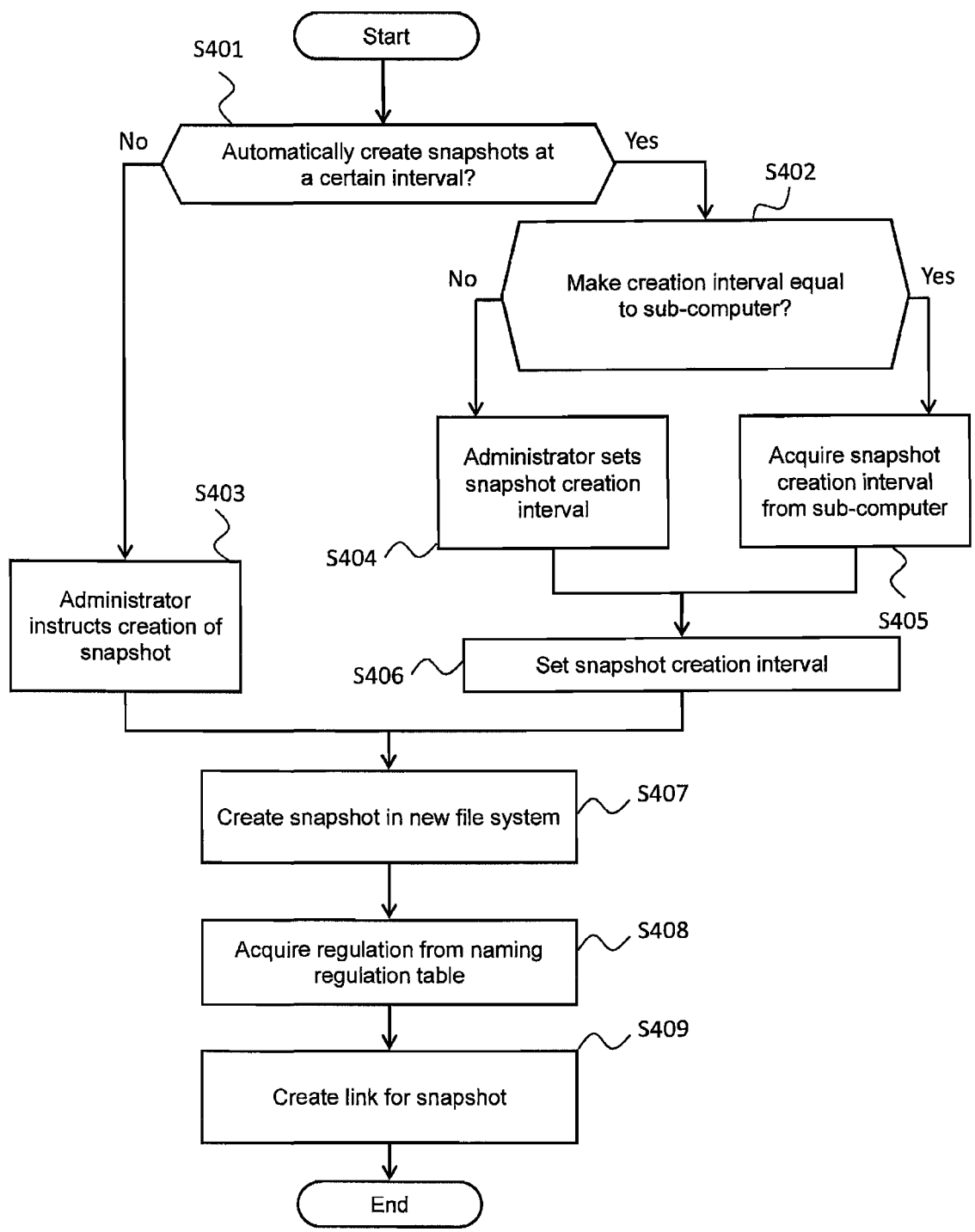
FIG. 11 is a flowchart showing an example of the procedure for creating links of the same naming regulation as the link created for the snapshots of the sub-computer 170 in the Embodiment 3.

FIG. 11 is a flowchart showing an example of the procedure for creating a link of the same naming regulation as the links created for the snapshots of the sub-computer 170 in the Embodiment 3.

Firstly, the administrator operates the management computer 230 and inputs the information indicating whether the main computer 110 automatically creates snapshots at a certain interval or not (S401).

If the main computer 110 does not automatically create snapshots at a certain interval (S401: No), the administrator operates the management computer 230 and explicitly instructs the main computer 110 to create snapshots (S403).

If the main computer 110 automatically creates the snapshots at a certain interval (S401: Yes), the administrator operates the management computer 230 and inputs whether to make the creation interval equal to [the creation interval] of the sub-computer 170 or not (S402).

If the creation interval is equal to the creation interval of the sub-computer 170, the file system migration program 1310 acquires the snapshot creation interval from the snapshot management program 192 of the sub-computer 170 (S405). Meanwhile, if the creation interval is not equal to the creation interval of the sub-computer 170, the administrator operates the management computer 230 and inputs the information indicating the snapshot creation interval (S404).

Next, the snapshot management program 136 stores the information input at S404 (the information indicating the creation interval) or the information indicating the creation interval acquired at S405 in the memory 130 (S406). The relevant information indicating the creation interval may also be stored as the non-volatile value in the storage device 140.

Next, the snapshot management program 136 creates the snapshot of the new file system 142 with an instruction from the administrator for creating the snapshot or the incoming of the creation time based on the creation interval set at S406 as the trigger (S407).

Next, the link management program 132 acquires the snapshot naming regulation used in the new file system 142 from the naming regulation table 139 (S408).

Finally, the link management program 132 creates the link associated with the snapshots created at S407 in accordance with the naming regulation acquired at S408 (S409).

By performing the above-mentioned processing, the client 240 can access the snapshots created in the new file system 142 by the same method for accessing the snapshots in the sub-computer 170. Therefore, it is not necessary to be conscious of the snapshots to what point of time exist in the sub-computer 170 and the snapshots from what point of time exist in the main computer 110, and therefore the access to the snapshots becomes easier. Furthermore, by automatically acquiring the snapshot creation interval of the sub-computer 170, the step at which the administrator sets the snapshot interval again can be skipped.

Embodiment 4

Hereinafter, the Embodiment 4 of the present invention is explained. The differences from the Embodiments from 1 to 3 are mainly explained therein, and the explanation of what is common to the Embodiments from 1 to 3 is omitted or simplified.

Since the capacities of the storage devices (200 and 140) are required for maintaining the snapshots, the computers (110 and 170) comprise the function of deleting unnecessary snapshots generally. If the snapshot of the sub-computer 170 is deleted, the link destination of the link created in the Embodiments from 1 to 3 disappears. This causes an access error.

In the present embodiment, if the snapshot is deleted, the link corresponding to the snapshot is also deleted.

The configuration of the computer system related to the present embodiment may be the same as the configuration of the computer system related to the Embodiment 1.

Figure 12:
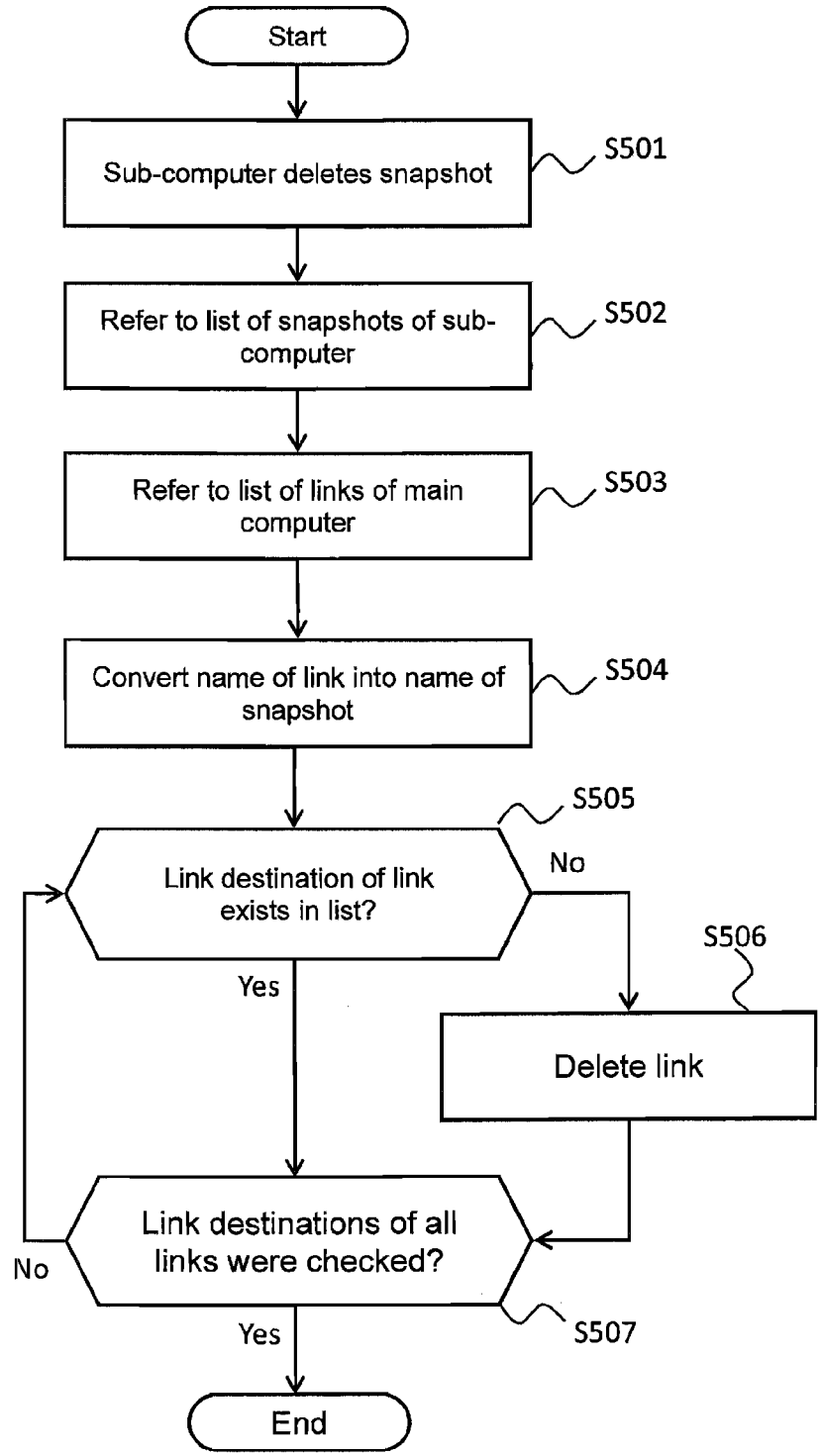
FIG. 12 is a flowchart showing an example of the processing procedure for deleting the links in the Embodiment 4.

FIG. 12 is a flowchart showing an example of the processing procedure for deleting the links in the Embodiment 4.

Firstly, the sub-computer 170 deletes a snapshot (S501).

Next, the snapshot list acquisition program 135 identifies the list of the snapshots of the sub-computer 170 by using the method described in the Embodiment 1 (S502).

Next, the link management program 132 identifies the list of the links existing in the file system 141 or in the new file system 142 (S503).

Next, the link management program 132 refers to the naming regulation table 139 and converts the link name identified at S503 into the name of the snapshot in the sub-computer 170 (S504). Specifically speaking, in the present embodiment, in addition to uniquely creating the name of the link based on the snapshot name, it is also possible to create the name of the snapshot uniquely based on the name of the link reversely.

Next, the link management program 132 checks whether the name converted at S504 is included in the list identified at S502 or not (S505).

If the converted name is not included in the list, that is, if the snapshot is deleted from the sub-computer 170 (S505: No), the link management program 132 deletes the relevant link (S506).

Finally, the link management program 132 terminates the processing when the link management program 132 performed the check of S505 for all the links identified at S503 (S507: Yes).

By performing the above-mentioned processing, the links corresponding to the deleted snapshots can be deleted. Therefore, the consistency between the links and the snapshots can be maintained. By this method, an access error for the deleted snapshot can be prevented.

Embodiment 5

Hereinafter, the Embodiment 5 of the present invention is explained. The differences from the Embodiments from 1 to 4 are mainly explained therein, and the explanation of what is common to the Embodiments from 1 to 4 is omitted or simplified.

In the present embodiment, if the sub-computer 170 newly creates a snapshot after a link is created in the main computer 110, the link corresponding to the snapshot is created in the main computer 110.

Figure 21:
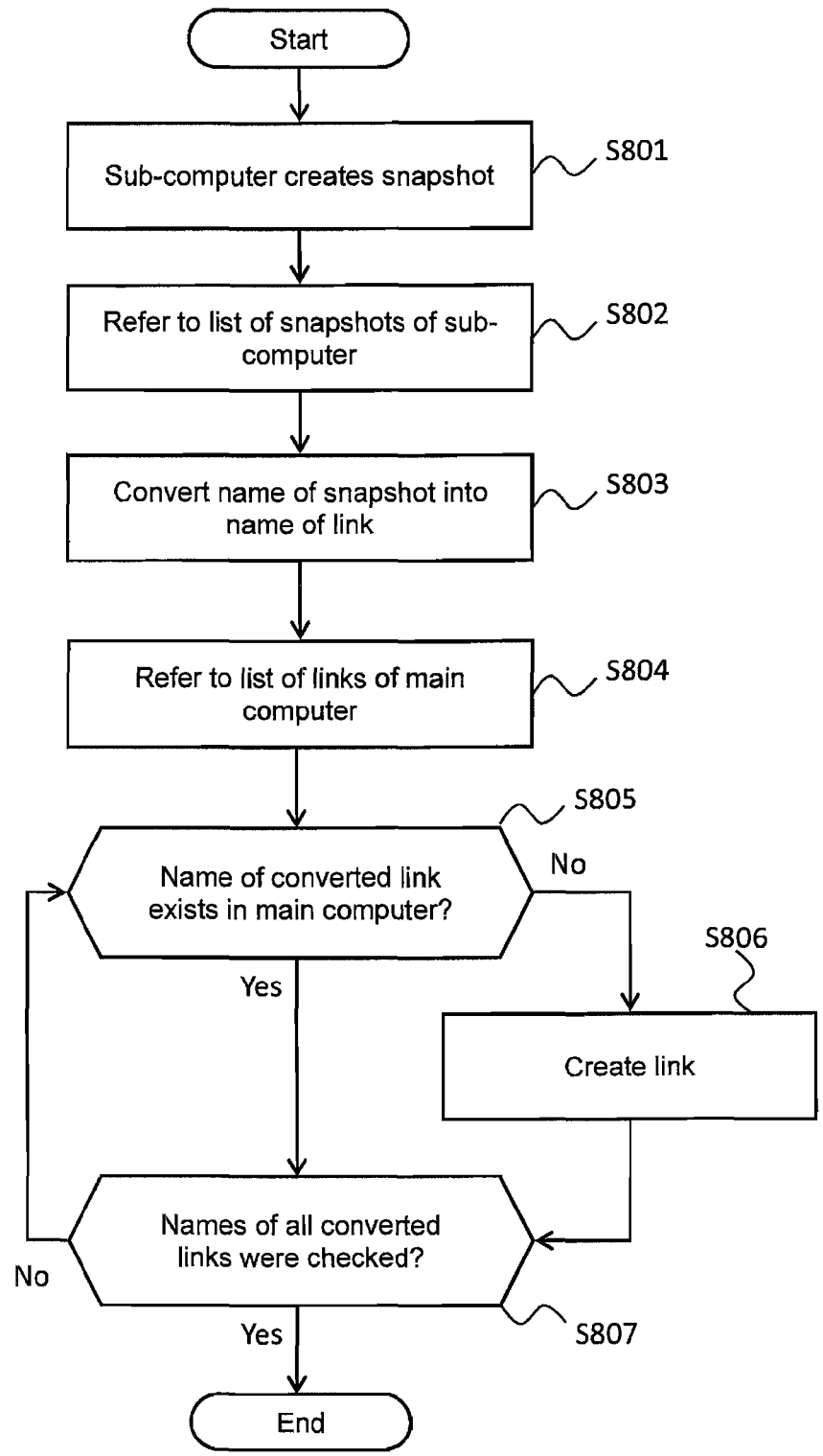
FIG. 21 is a flowchart showing an example of the processing procedure for creating links in the Embodiment 5.

FIG. 21 is a flowchart showing an example of the processing procedure for creating links in the Embodiment 5.

Firstly, the sub-computer 170 creates a snapshot (S801).

Next, the snapshot list acquisition program 135 identifies the list of snapshots in the sub-computer by using the method described in the Embodiment 1 and identifies the date and time of creating each of the snapshots (S802).

Next, the link management program 132 creates the name of a link by using the method described in the Embodiment 1 (S803).

Next, the link management program 132 identifies the list of the links existing in the file system 141 or in the new file system 142 (S804).

Next, the link management program 132 checks whether the name converted at S803 is included in the list identified at S804 or not (S805).

If the converted name is not included in the list, that is, if the snapshot is newly created in the sub-computer 170 (S805: No), the link management program 132 creates a link corresponding to the snapshot (S806). The method for creating the link is the same as the creation method in the Embodiment 1.

Finally, the link management program 132 terminates the processing when the link management program 132 performed the check of S805 for all the links converted at S803 (S807: Yes).

By performing the above-mentioned processing, the link corresponding to the snapshot newly created in the sub-computer 170 can be created. By this method, even if a snapshot is newly created in the sub-computer 170, access to the snapshot becomes easy.

Embodiment 6

Hereinafter, the Embodiment 6 of the present invention is explained. The differences from the Embodiments from 1 to 5 are mainly explained therein, and the explanation of what is common to the Embodiments from 1 to 5 is omitted or simplified.

According to the present embodiment, if the sub-computer 170 (e.g. another NAS device) is connected to the main computer 110 (e.g. a NAS device) comprising the virtualization function, the link corresponding to the log which the sub-computer 170 comprises (e.g. a log file) is created by the main computer 110. The sub-computer 170 comprises log files instead of or in addition to the snapshots in the Embodiment 5. The type of the log file may be arbitrary. For example, the log file may be a file indicating an error log or may also be a file indicating an access log.

The log function is broadly utilized as an essential function for detecting failures and others. Nearly all computers (e.g. NAS devices) comprise the log function currently. The log file name and the storage location of the log file might be different per computer type. Therefore, the access method for the log file might be different per computer type. Therefore, the virtualization function must absorb the differences.

Therefore, the name of the link corresponding to the log file is generated in accordance with a certain regulation independent of the type of the computer (e.g. NAS). By this method, the user of the client 240 can access the log file of the sub-computer 170 as if [the log file] was the log file which the main computer 110 comprises without being conscious of the differences per computer type.

Figure 13:
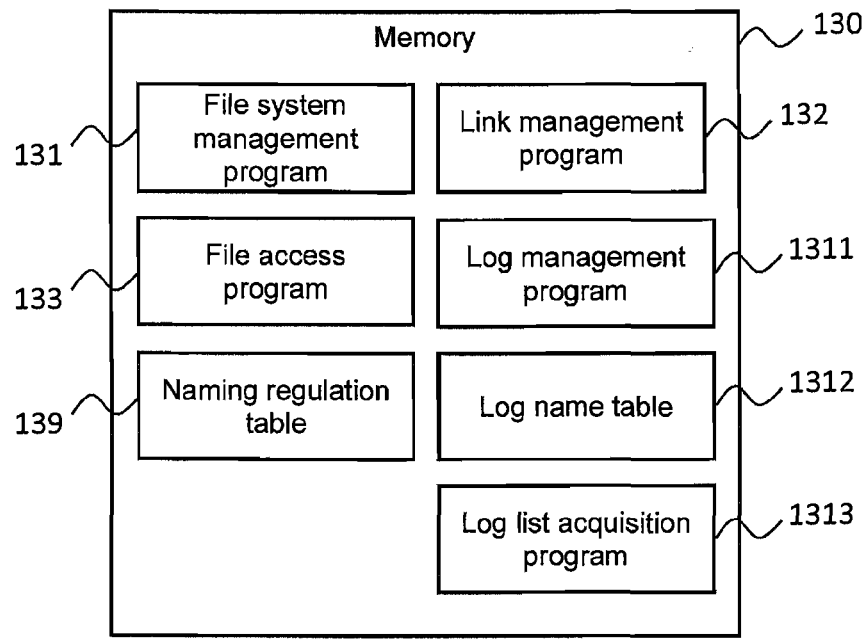
FIG. 13 shows an example of information and programs stored in the memory 130 which the main computer 110 related to the Embodiment 6 comprises.

FIG. 13 shows an example of information and programs stored in the memory 130 which the main computer 110 related to the Embodiment 6 comprises.

The memory 130 stores a log management program 1311, a log name table 1312, and a log list acquisition program 1313 in addition to the information and programs shown in FIG. 1.

The log management program 1311 comprises a function of performing the processing for log files output by the programs which the main computer 110 comprises. The concrete examples of the processing are the processing for deleting the log files and the log rotation processing. The log rotation processing is the processing in which a new log file is created if the size of the log file exceeds a certain amount (or regularly). The name of the new log file is another name based on the name of the log file whose size exceeds the certain amount. Hereinafter, logs are additionally written to the new log file. The name of the log file generally tends to include the type of the log and the number of times of rotations. For example, the name of the log file for recording the information of the user who accessed the computer and which is rotated once is access_1.log.

The log list acquisition program 1313 comprises a function of performing the processing for identifying the list of logs which the sub-computer 170 comprises. The concrete example of the processing is the processing for identifying the list of file names included in the volumes of the sub-computer 170.

Figure 14:
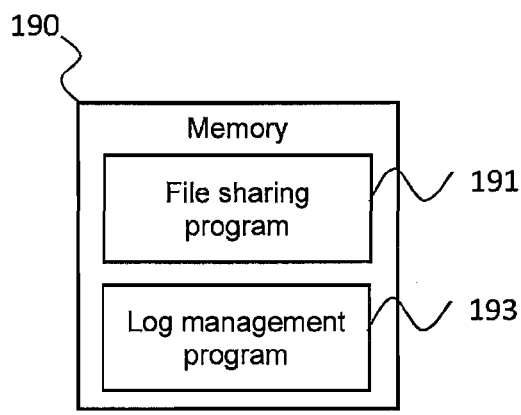
FIG. 14 shows an example of programs stored in the memory 190 which the sub-computer 170 related to the Embodiment 6 comprises.

FIG. 14 shows an example of the programs stored in the memory 190 which the sub-computer 170 related to the Embodiment 6 comprises.

The memory 190 stores a log management program 193 in addition to the file sharing program 191.

The log management program 193 comprises a function of performing the processing for log files output by the programs which the sub-computer 170 comprises. The concrete examples of the processing may be the same as the log management program 1311.

Figure 15:
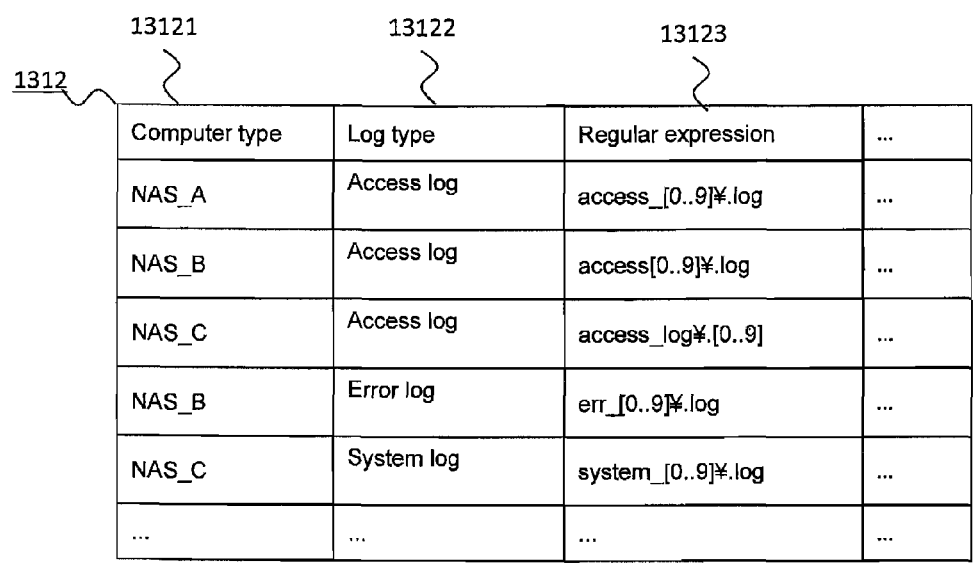
FIG. 15 shows an example of the configuration of a log name table 1312.

FIG. 15 shows an example of the configuration of the log name table 1312.

The log name table 1312 comprises at least a computer type 13121, a log type 13122, and a regular expression 13123 per computer type, for example. The computer type 13121 indicates the type of the computer. The log type 13122 indicates the type of the log such as an access log and an error log. The regular expression 13123 indicates the regular expression of the log name.

Figure 16:
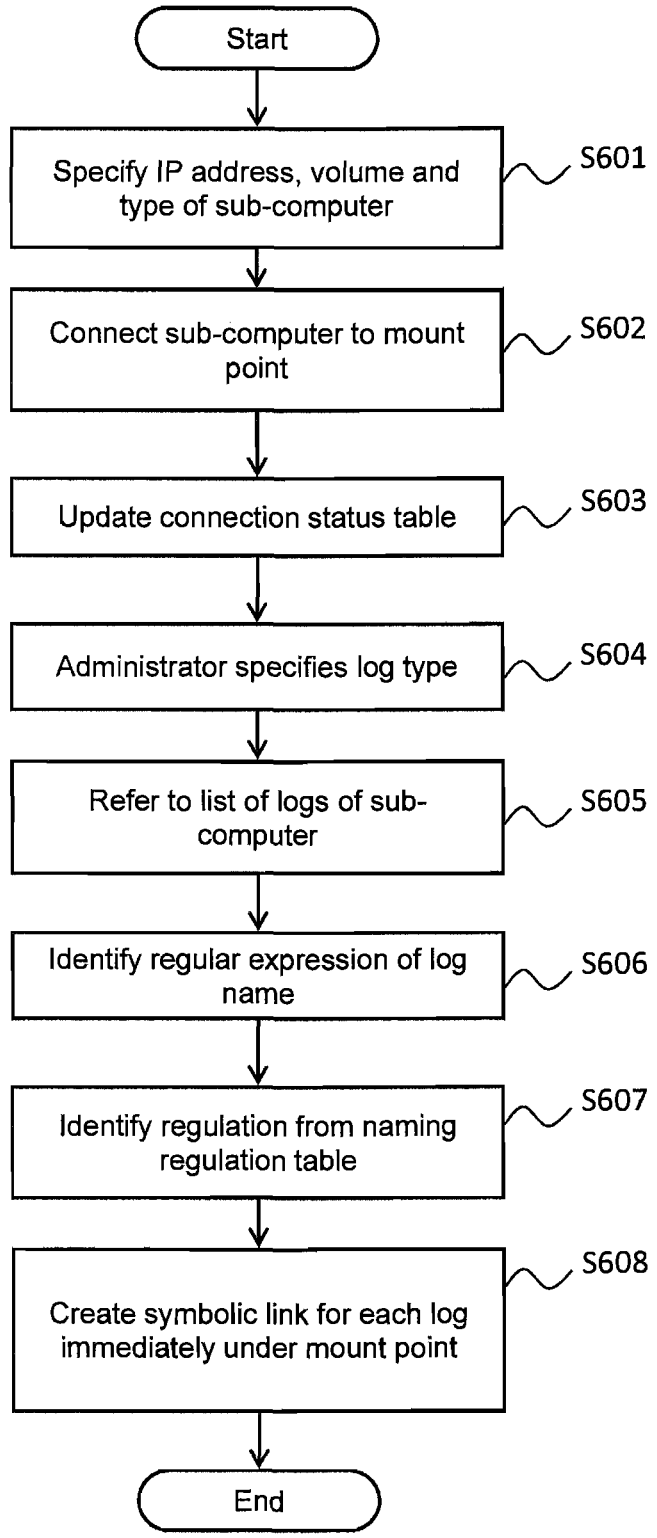
FIG. 16 is a flowchart showing an example of the processing procedure for virtualizing the log files which the sub-computer 170 comprises when connecting the sub-computer 170 to the main computer 110 in the Embodiment 6.

FIG. 16 is a flowchart showing an example of the processing procedure for virtualizing the log files which the sub-computer 170 comprises when connecting the sub-computer 170 to the main computer 110 in the Embodiment 6.

Firstly, the administrator operates the management computer 230 and specifies the mount point, the IP address of the sub-computer 170, the volume which the file sharing program 191 provides, and the type of the sub-computer to the main computer 110 (S601). At this step, for virtualizing the logs in the sub-computer 170, the administrator specifies the volume to which the logs are output (the directory in which the log files are stored) among the volumes in the sub-computer 170. Furthermore, the specified mount point may be the directory to which the logs of the main computer 110 are output.

Next, the file access program 133 connects the relevant volume in the sub-computer 170 to the mount point (S602). By this processing, the log files of the sub-computer 170 are virtually created in the file system 141 of the main computer 110. By this method, the client 240 can access the log files which the sub-computer 170 comprises via the main computer 110.

Next, the file access program 133 adds the value specified by the administrator at S601 to the connection status table 138 (S603).

Next, the administrator operates the management computer 230 and specifies the log type to the main computer 110 (S604).

Next, the log list acquisition program 1313 identifies the list of the log files which the sub-computer 170 comprises (S605).

Next, in accordance with the computer type specified at S601 and the log type specified at S604, the link management program 132 refers to the log name table 1312 and identifies the regular expression of the log name (S606).

Next, the link management program 132 refers to the naming regulation table 139 and acquires the naming regulation of the link (S607). For example, if the naming regulation is access_<counter>.log, the link management program 132 creates the name of the log by assigning the number of times of rotation of each of the logs identified at S605.

Finally, the link management program 132 creates the link corresponding to the log file which matches the regular expression of S606 among the one or more log files identified at S605 immediately under the mount point specified by the administrator at S601 in accordance with the naming regulation identified at S607 (S608).

By performing the above-mentioned processing, in the file system 141 of the main computer 110, per type of the log file which the sub-computer 170 comprises, links corresponding to the log files can be created. Furthermore, the links comprise the names complying with a certain regulation independent of the type of the sub-computer 170. For example, as shown in FIG. 20, by specifying "access_0.log" regardless of the computer type, the client 240 can access the log file in the sub-computer 170. Specifically speaking, seen from the user using the client 240, it seems as if the main computer 110 was creating the log files. As a result of this, the log files which the sub-computer 170 comprises are supposed to be virtualized in the main computer 110. By this method, even in the environment in which a plurality of sub-computers 170 are connected, it becomes unnecessary to be conscious of which sub-computer 170 the log files exist in, and log management becomes easy.

Embodiment 7

Hereinafter, the Embodiment 7 of the present invention is explained. The differences from the Embodiment 6 are mainly explained therein, and the explanation of what is common to the Embodiment 6 is omitted or simplified.

According to the present embodiment, if the rotation of the log file occurs in the main computer 110 after the Embodiment 6, the name of the link corresponding to the log file of the sub-computer 170 is changed to a name in which the number of times of rotation is increment by one and, at the same time, a link of the same naming regulation as the relevant link is newly created for the rotated log file.

The computer system related to the present embodiment may be the same as the computer system related to the Embodiment 6.

Figure 17:
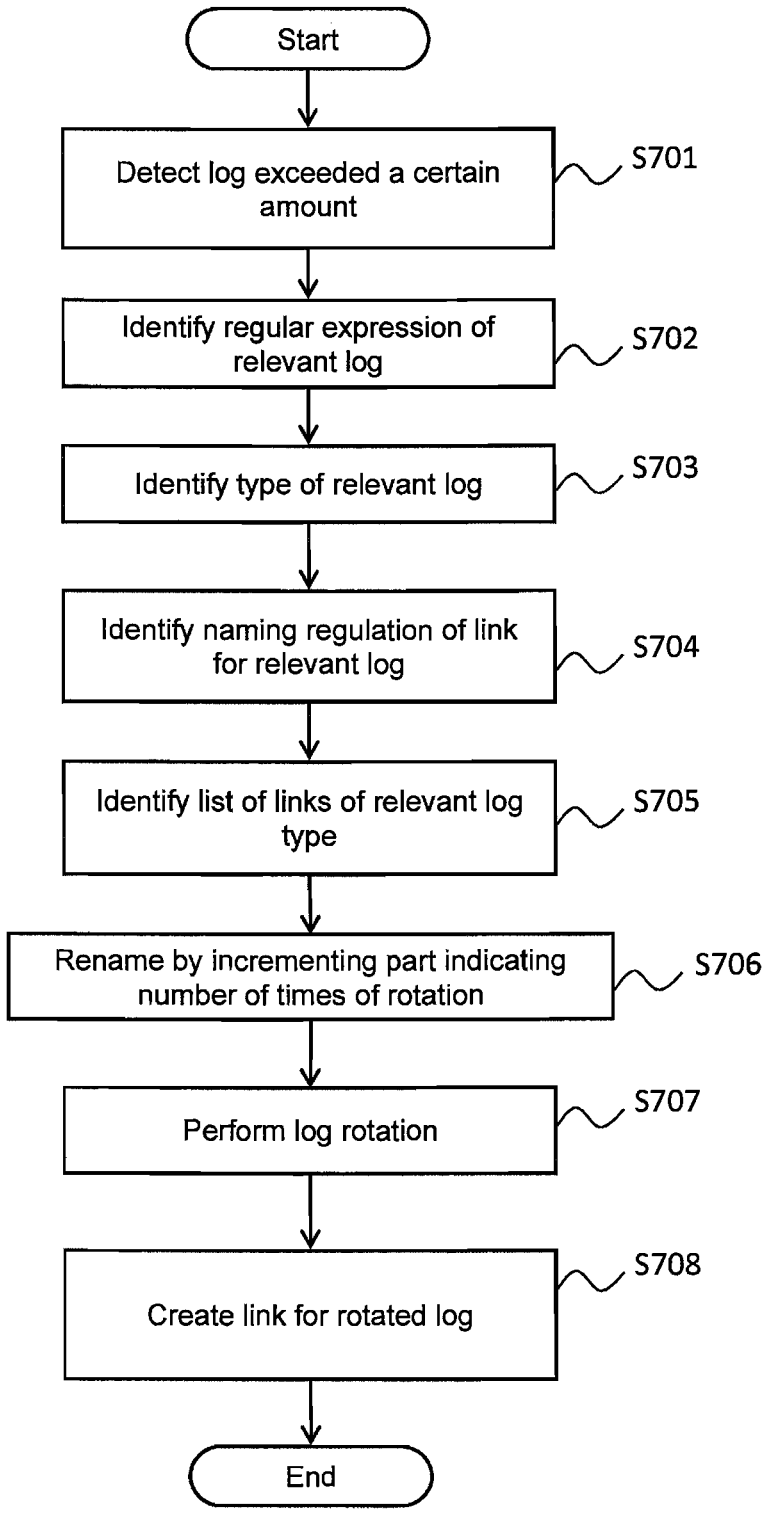
FIG. 17 is a flowchart showing an example of the procedure for changing the name of a link and also newly creating a link in the Embodiment 7.

FIG. 17 is a flowchart showing an example of the procedure for changing the name of the link and also newly creating a link in the Embodiment 7.

Firstly, the log management program 1311 detects that the capacity (size) of a certain log file exceeds a certain amount (S701). The existing method can be adopted for this case. Hereinafter, the log file whose capacity exceeds a certain amount is referred to as a "target log file".

Next, the log management program 1311 refers to all the regular expressions 13123 in the log name table 1312 (S702).

Next, the log management program 1311 identifies the regular expression 13123 which matches the computer type of the sub-computer 170 comprising the target log file and the name of the target log file and identifies the log type 13122 corresponding to the regular expression 13123 (i.e. the log type 13122 of the target log file) (S703).

Next, the link management program 132 refers to the naming regulation table 139 and identifies the naming regulation 1392 corresponding to the virtualization target which matches the log type 13122 identified at S703 (S704).

Next, the link management program 132 identifies the list of links corresponding to the log type 13122 identified at S703 among the created links (S705).

Next, the link management program 132 identifies the part indicating the number of times of log rotation in the link name in accordance with the naming regulation 1392 identified at S704 and changes the value of the relevant part for all the links identified at S705 (increments the value of the relevant part by one) (S706). As a result of this, all the link names identified at S705 are supposed to have been changed.

Next, the log management program 1311 performs the log rotation processing for the target log file (S707). A new log file is created by this log rotation processing.

Finally, the link management program 132 creates a link with the name in which the number of times of rotation is specified as one by the naming regulation 1392 identified at S704 for the new log file created in the rotation processing of S707 (S708).

By performing the above-mentioned processing, the log files which the sub-computer 170 comprises and the links for the new log files created in the log rotation processing are created in the file system 141 of the main computer 110. The links corresponding to the log files comprise the names by a certain regulation independent of the type of the main computer 110 and the type of the sub-computer 170. Therefore, seen from the user using the client 240, it seems as if the main computer 110 comprises all the log files, and the access to the log files becomes easy. By this method, the log files which the main computer 110 comprises and the log files which the sub-computer 170 comprises are virtualized in the main computer 110.

Though some of the embodiments of the present invention are explained above, these are explanatory and illustrative of the present invention and scope of the present invention is not intended to be limited to any of these embodiments. For example, two or more of arbitrary embodiments among the Embodiments from 1 to 7 may be combined.

Reference Sign List

110: Main computer, 138: Connection status table, 139: Naming regulation table, 170: Sub-computer

The invention claimed is:

1. A first computer, which accesses a first file system, the first computer comprising:
   one or more communication interface devices to which a client computer for transmitting an access request, which specifies an object that exists in the first file system, and a second computer, which accesses a second file system are coupled; and
   a controller, which is coupled to the one or more communication interface devices, wherein the second file system comprises a shared directory, wherein the shared directory is configured to store specific objects, wherein each of the specific objects is an object that complies with a path name comprising a name determined in accordance with a type of the second computer, wherein the specific objects include snapshots and a log file, wherein the controller is configured to:

(a) mount the shared directory to the first file system;

(b) identify a list of the snapshots in the second file system, and (c) create, in the first file system, a first link for each of the snapshots, by assigning year, month, day, hour, minute and second of the time of making the snapshot, which comprises a name determined in accordance with "<yyyy.mm.dd-hh.mm.ss>", (d) create, in the first file system, a second link, which comprises a name determined in accordance with the number of log rotations of the log file, and which corresponds to the log file, (e) regularly or in a case where the size of the log file exceeds a certain amount, update the number of log rotations of the log file by incrementing by one the number of rotations of the log file, (f) change the name of the second link based on the updated number of log rotations of the log file, and (g) create a new log file in the first file system, and create, in the first file system, a third link which comprises a name determined based on the updated number of log rotations, and which corresponds to the new log file.

2. A computer according to claim 1, wherein the controller is configured to:

(h) identify a snapshot creation interval of the second computer, and wherein the controller is configured to perform performs processing of (c) at the interval identified in (h).

3. A computer according to claim 2, wherein the controller is configured to:

(i) acquire information related to one or more snapshots in the second file system;

(j) determine, based on the information acquired in (i), whether or not a snapshot corresponding to the link is included among the one or more snapshots; and (k) in a case where a result of the determination of (j) is affirmative, delete a link corresponding to a nonexistent snapshot.

4. A computer according to claim 1, further comprising:

a storage resource coupled to the controller, wherein the storage resource stores information of (A) and (B) below:

(A) first management information denoting a corresponding relationship between a point in the first file system and a type of a second computer, which accesses a second file system comprising a shared directory mounted to this point; and (B) second management information denoting a corresponding relationship between the type of the second computer and a method for identifying the specific object, and wherein the controller is configured to:

(1) identify one of the specific objects based on the first and the second management information.

5. A computer according to claim 4, wherein the second management information comprises information denoting the corresponding relationship for each type of the specific object, and wherein the controller is configured to identify, in each of (c), (d) and (g), one of the specific objects using a method that complies with the type of the specific object based on the first and the second management information.

6. A computer according to claim 5, wherein the storage resource further stores third management information, which comprises information denoting the naming regulation for each type of the specific object, and wherein the controller is configured to decide a link name, in each of (c), (d) and (g) based on the third management information.

7. A data management method in accordance with a first computer, which accesses a first file system coupled to a client computer for transmitting an access request specifying an object that exists in the first file system and to a second computer, which accesses a second file system, the data management method comprising:

(a) mounting, to the first file system a shared directory, which is included in the second file system, and which stores specific objects, wherein each of the specific objects is an object that complies with a path name comprising a name determined in accordance with a type of the second computer, and wherein the specific objects includes snapshots and a log file;

(b) identifying a list of the snapshots in the second file system, (c) creating in the first file system a first link for each of the snapshots, by assigning year, month, day, hour, minute and second of the time of making the snapshot which comprises a name determined in accordance with "<yyyy.mm. dd-hh.mm.ss>", (d) creating, in the first file system, a second link, which comprises a name determined in accordance with the number of log rotations of the log file, and which corresponds to the log file, (e) regularly or in a case where the size of the log file exceeds a certain amount, updating the number of log rotations of the log file by incrementing by one the number of rotations of the log file, (e) changing the name of the second link based on the updated number of log rotations of the log file, and (f) creating a new log file in the first file system, and creating, in the first file system, a third link which comprises a name determined based on the updated number of log rotations, and which corresponds to the new log file.

* * * * *